US012731321B2

(12) United States Patent
Teraguchi

(10) Patent No.: US 12,731,321 B2
(45) Date of Patent: Sep. 8, 2026

(54) INFORMATION PROCESSING DEVICE AND INFORMATION PROCESSING METHOD

(71) Applicants: Nissan Motor Co., Ltd., Kanagawa (JP); RENAULT S.A.S., Boulogne-Billancourt (FR)

(72) Inventor: Takehito Teraguchi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 311 days.

(21) Appl. No.: 18/550,816

(22) PCT Filed: Mar. 15, 2021

(86) PCT No.: PCT/IB2021/000186

§ 371 (c)(1),
(2) Date: Sep. 15, 2023

(87) PCT Pub. No.: WO2022/195314

PCT Pub. Date: Sep. 22, 2022

(65) Prior Publication Data

US 2024/0185499 A1 Jun. 6, 2024

(51) Int. Cl.
*G06T 15/00* (2011.01)
*B60W 50/14* (2020.01)
(Continued)

(52) U.S. Cl.
CPC ............. *G06T 15/00* (2013.01); *B60W 50/14* (2013.01); *G06T 5/50* (2013.01); *G06V 20/56* (2022.01);
(Continued)

(58) Field of Classification Search
CPC . G06T 15/00; G06T 5/50; G06T 2207/20221; B60W 50/14; G06V 20/56;
(Continued)

(56) References Cited

U.S. PATENT DOCUMENTS

2019/0066382 A1 2/2019 Kubo et al.
2019/0361436 A1* 11/2019 Ueda ........................ G08G 1/09
(Continued)

FOREIGN PATENT DOCUMENTS

JP 2019-184356 A 10/2019
JP 2020-003890 A 1/2020

*Primary Examiner* — Sheree N Brown
(74) *Attorney, Agent, or Firm* — Osha Bergman Watanabe & Burton LLP

(57) ABSTRACT

The present invention acquires surrounding information of surrounding environment of a vehicle; sets a virtual viewpoint position ahead of the vehicle in a traveling direction; uses the acquired surrounding information and generates virtual surrounding information indicating the surrounding environment at the set virtual viewpoint position; transmits a first control signal for controlling an external device located at a location away from the vehicle to display the generated virtual surrounding information; receives driving operation information on a driving operation of the vehicle output from the external device; generates driving assistance information for assisting driving of the vehicle based on the received driving operation information; and generates a second control signal for controlling an output device installed in the vehicle to output the driving assistance information.

10 Claims, 5 Drawing Sheets

(51) Int. Cl.
*G06T 5/50* (2006.01)
*G06V 20/56* (2022.01)
*H04N 13/117* (2018.01)

(52) U.S. Cl.
CPC .. *H04N 13/117* (2018.05); *G06T 2207/20221* (2013.01)

(58) Field of Classification Search
CPC .. H04N 13/117; G08G 1/0112; G08G 1/0116; G08G 1/04; G08G 1/096716; G08G 1/164; G08G 1/096775; G05D 2105/22; G05D 2107/13; G05D 2109/10; G05D 1/2249
USPC .......................................................... 345/419
See application file for complete search history.

(56) References Cited

U.S. PATENT DOCUMENTS

| | | | | |
|---|---|---|---|---|
| 2020/0031283 | A1* | 1/2020 | Nakasho | G08G 1/16 |
| 2020/0133259 | A1* | 4/2020 | Van Wiemeersch | G05D 1/0022 |
| 2022/0044501 | A1* | 2/2022 | Lavoie | G07C 5/0808 |

* cited by examiner

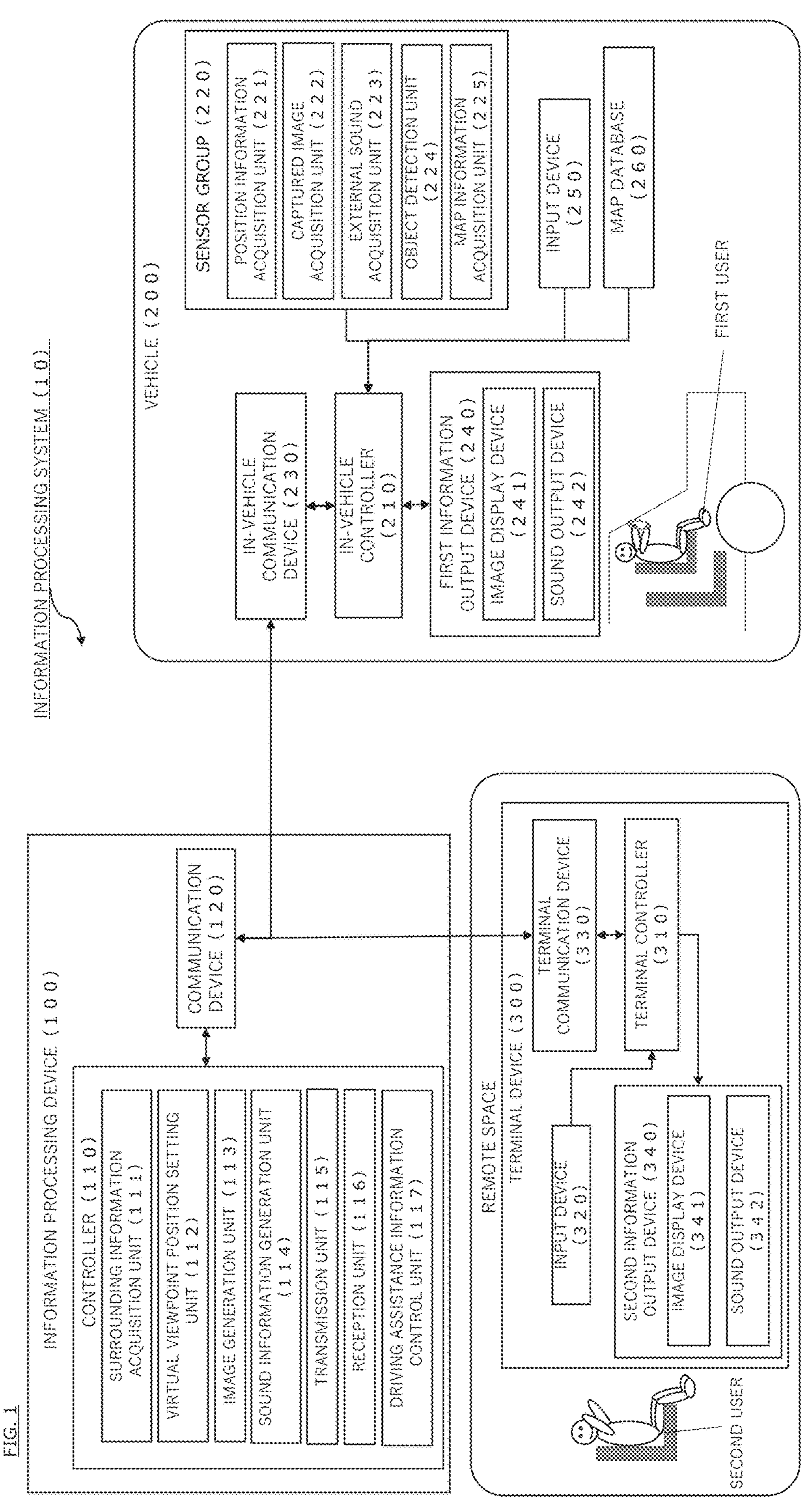
FIG. 1
INFORMATION PROCESSING SYSTEM (10)
INFORMATION PROCESSING DEVICE (100)
CONTROLLER (110)
SURROUNDING INFORMATION ACQUISITION UNIT (111)
VIRTUAL VIEWPOINT POSITION SETTING UNIT (112)
IMAGE GENERATION UNIT (113)
SOUND INFORMATION GENERATION UNIT (114)
TRANSMISSION UNIT (115)
RECEPTION UNIT (116)
DRIVING ASSISTANCE INFORMATION CONTROL UNIT (117)
COMMUNICATION DEVICE (120)
REMOTE SPACE
TERMINAL DEVICE (300)
TERMINAL COMMUNICATION DEVICE (330)
TERMINAL CONTROLLER (310)
INPUT DEVICE (320)
SECOND INFORMATION OUTPUT DEVICE (340)
IMAGE DISPLAY DEVICE (341)
SOUND OUTPUT DEVICE (342)
SECOND USER
VEHICLE (200)
IN-VEHICLE COMMUNICATION DEVICE (230)
IN-VEHICLE CONTROLLER (210)
FIRST INFORMATION OUTPUT DEVICE (240)
IMAGE DISPLAY DEVICE (241)
SOUND OUTPUT DEVICE (242)
SENSOR GROUP (220)
POSITION INFORMATION ACQUISITION UNIT (221)
CAPTURED IMAGE ACQUISITION UNIT (222)
EXTERNAL SOUND ACQUISITION UNIT (223)
OBJECT DETECTION UNIT (224)
MAP INFORMATION ACQUISITION UNIT (225)
INPUT DEVICE (250)
MAP DATABASE (260)
FIRST USER

FIG. 2A

VEHICLE V 3

VIRTUAL VEHICLE

VEHICLE V 1

VEHICLE 2 0 0

VEHICLE V 2

FIG. 2B

VEHICLE V 3

VIRTUAL VEHICLE

VEHICLE V 2

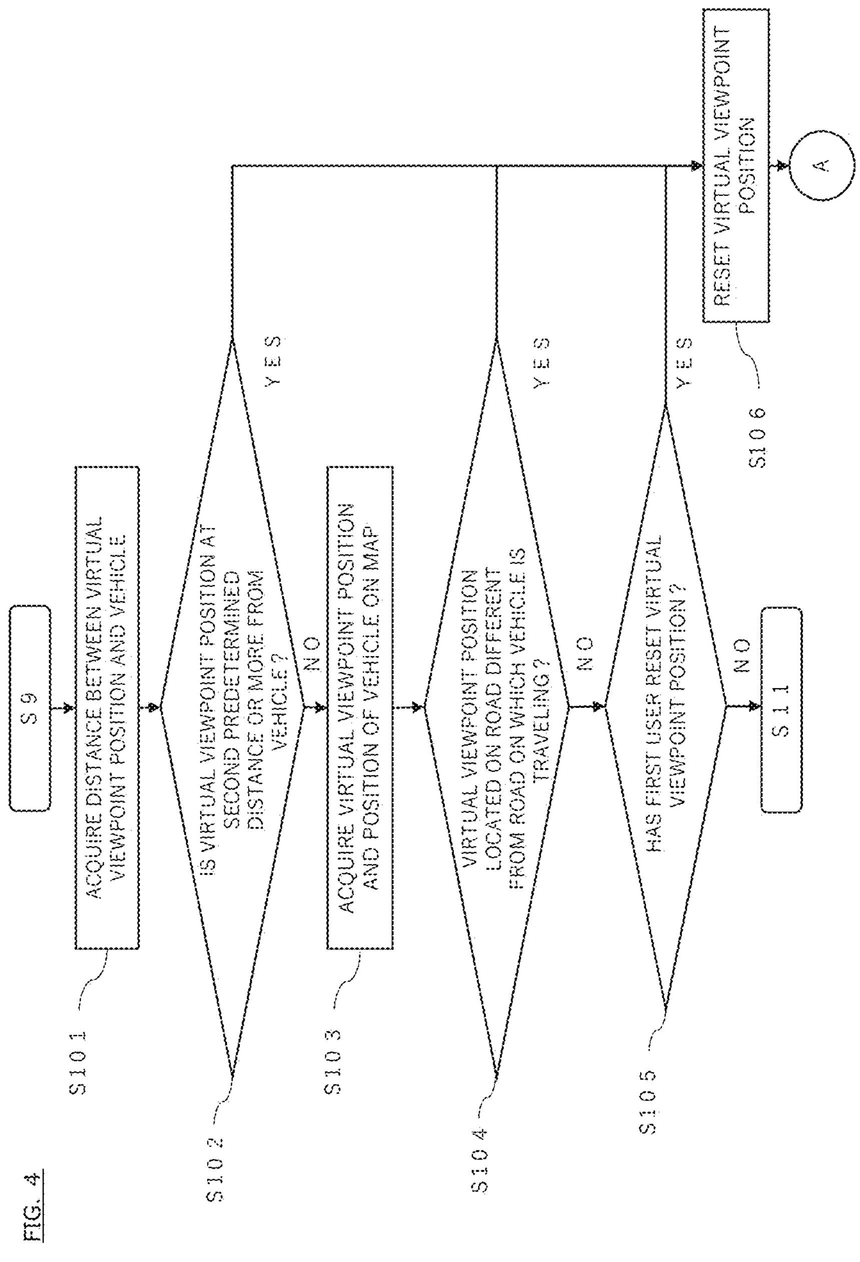
FIG. 4
S9
S101
ACQUIRE DISTANCE BETWEEN VIRTUAL VIEWPOINT POSITION AND VEHICLE
S102
IS VIRTUAL VIEWPOINT POSITION AT SECOND PREDETERMINED DISTANCE OR MORE FROM VEHICLE ?
YES
NO
S103
ACQUIRE VIRTUAL VIEWPOINT POSITION AND POSITION OF VEHICLE ON MAP
S104
VIRTUAL VIEWPOINT POSITION LOCATED ON ROAD DIFFERENT FROM ROAD ON WHICH VEHICLE IS TRAVELING ?
YES
NO
S105
HAS FIRST USER RESET VIRTUAL VIEWPOINT POSITION ?
YES
NO
S106
RESET VIRTUAL VIEWPOINT POSITION
A
S11

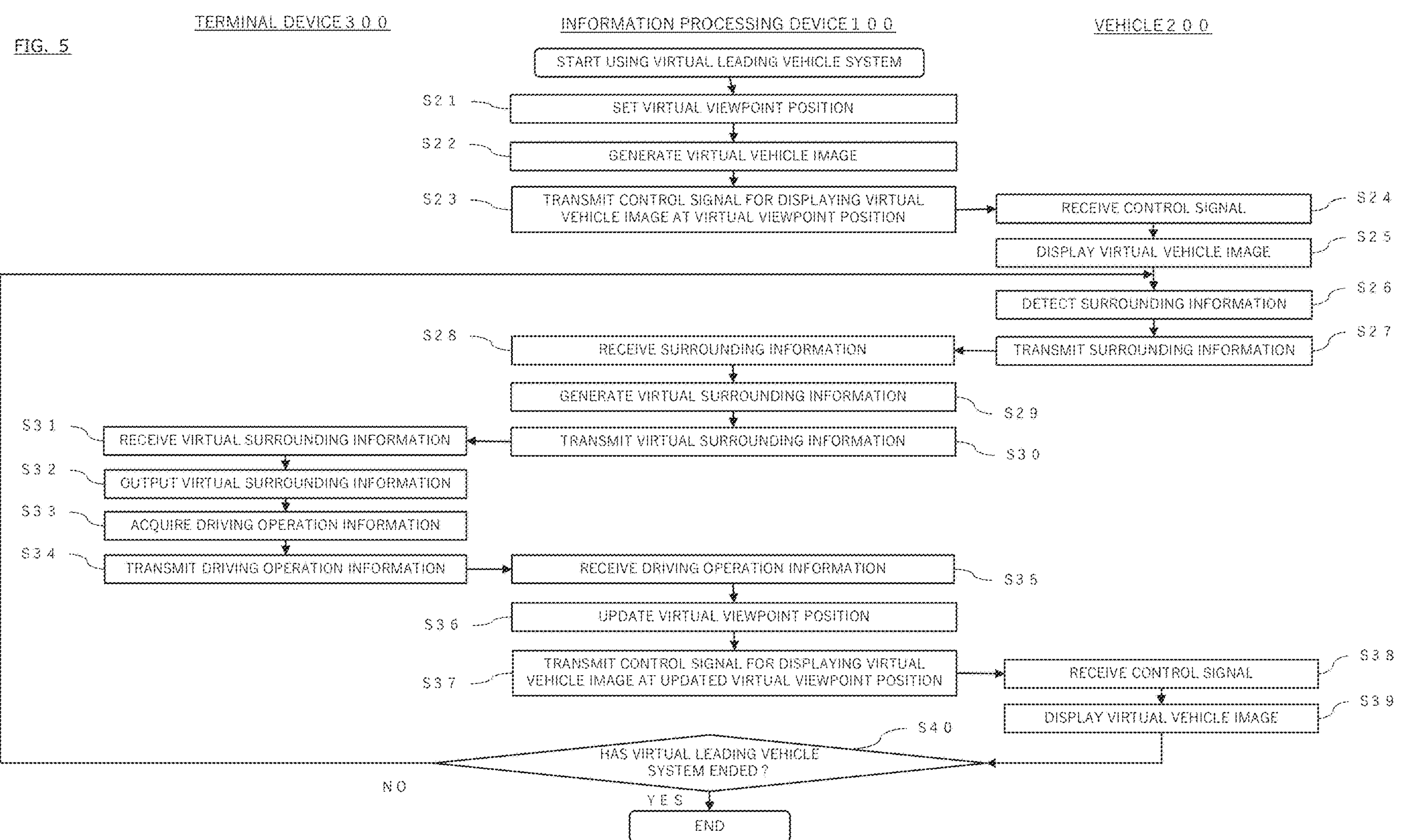
FIG. 5
TERMINAL DEVICE 3 0 0
INFORMATION PROCESSING DEVICE 1 0 0
VEHICLE 2 0 0
START USING VIRTUAL LEADING VEHICLE SYSTEM
S21
SET VIRTUAL VIEWPOINT POSITION
S22
GENERATE VIRTUAL VEHICLE IMAGE
S23
TRANSMIT CONTROL SIGNAL FOR DISPLAYING VIRTUAL VEHICLE IMAGE AT VIRTUAL VIEWPOINT POSITION
S24
RECEIVE CONTROL SIGNAL
S25
DISPLAY VIRTUAL VEHICLE IMAGE
S26
DETECT SURROUNDING INFORMATION
S27
TRANSMIT SURROUNDING INFORMATION
S28
RECEIVE SURROUNDING INFORMATION
S29
GENERATE VIRTUAL SURROUNDING INFORMATION
S30
TRANSMIT VIRTUAL SURROUNDING INFORMATION
S31
RECEIVE VIRTUAL SURROUNDING INFORMATION
S32
OUTPUT VIRTUAL SURROUNDING INFORMATION
S33
ACQUIRE DRIVING OPERATION INFORMATION
S34
TRANSMIT DRIVING OPERATION INFORMATION
S35
RECEIVE DRIVING OPERATION INFORMATION
S36
UPDATE VIRTUAL VIEWPOINT POSITION
S37
TRANSMIT CONTROL SIGNAL FOR DISPLAYING VIRTUAL VEHICLE IMAGE AT UPDATED VIRTUAL VIEWPOINT POSITION
S38
RECEIVE CONTROL SIGNAL
S39
DISPLAY VIRTUAL VEHICLE IMAGE
S40
HAS VIRTUAL LEADING VEHICLE SYSTEM ENDED ?
YES
NO
END

INFORMATION PROCESSING DEVICE AND INFORMATION PROCESSING METHOD

TECHNICAL FIELD

The present invention relates to an information processing device and an information processing method.

BACKGROUND ART

There is a known vehicle remote assistance system in which when an autonomous vehicle is difficult to drive autonomously, an image of the surrounding area of the vehicle is transmitted to a remote control center, and an operator at the control center remotely controls the vehicle while viewing the image of the surrounding area displayed on an image display unit (Patent Document 1).

PRIOR ART DOCUMENT

Patent Document

[Patent Document 1] JP 2020-003890A

SUMMARY OF INVENTION

Problems to be Solved by Invention

In the technique of Patent Document 1, the operator steers the vehicle while viewing the traveling circumstances around the vehicle displayed on the image display unit, so that the vehicle can be steered in response to changes in the traveling circumstances without delay. However, when the operator remotely assists the driver on-board the vehicle for manual driving, there is a problem due to a time lag between an operator's remote assistance and the driver's driving according to the remote assistance, as follows. In the technique of Patent Document 1, since the operator performs remote assistance while viewing the surrounding traveling circumstances from the position of the vehicle, the driver cannot drive the vehicle in response to changes in the traveling circumstances without delay even if the driver follows the remote assistance.

A problem to be solved by the present invention is to provide an information processing device and an information processing method that enable a driver to follow remote assistance to drive the vehicle in response to changes in the traveling circumstances without delay.

Means for Solving Problems

The present invention solves the above problem by: acquiring surrounding information of surrounding environment of a vehicle; setting a virtual viewpoint position ahead of the vehicle in a traveling direction; using the surrounding information and generating virtual surrounding information indicating the surrounding environment at the virtual viewpoint position; transmitting a first control signal for controlling an external device located at a location away from the vehicle to output the generated virtual surrounding information; receiving driving operation information on a driving operation of the vehicle output from the external device; generating driving assistance information for assisting driving of the vehicle based on the received driving operation information; and generating a second control signal for controlling an output device installed in the vehicle to output the driving assistance information.

Effect of Invention

According to the present invention, the driver can drive the vehicle by following remote assistance in response to changes in the traveling circumstances without delay.

BRIEF DESCRIPTION OF DRAWINGS

FIG. 1 is a diagram illustrating an example of the configuration of an information processing device according to the present embodiment.

FIG. 2A is a diagram illustrating an example of the surrounding environment of a vehicle.

FIG. 2B is a diagram illustrating an example of displaying a positional relationship between a virtual vehicle and vehicles around the virtual vehicle.

FIG. 4 is a flowchart illustrating the example of the procedure of the information processing method in the information processing device of the present embodiment.

FIG. 5 is a flowchart illustrating an example of the procedure of the information processing method in the information processing device, a vehicle, and a terminal device, according to the present embodiment.

MODE(S) FOR CARRYING OUT THE INVENTION

Figure 3:
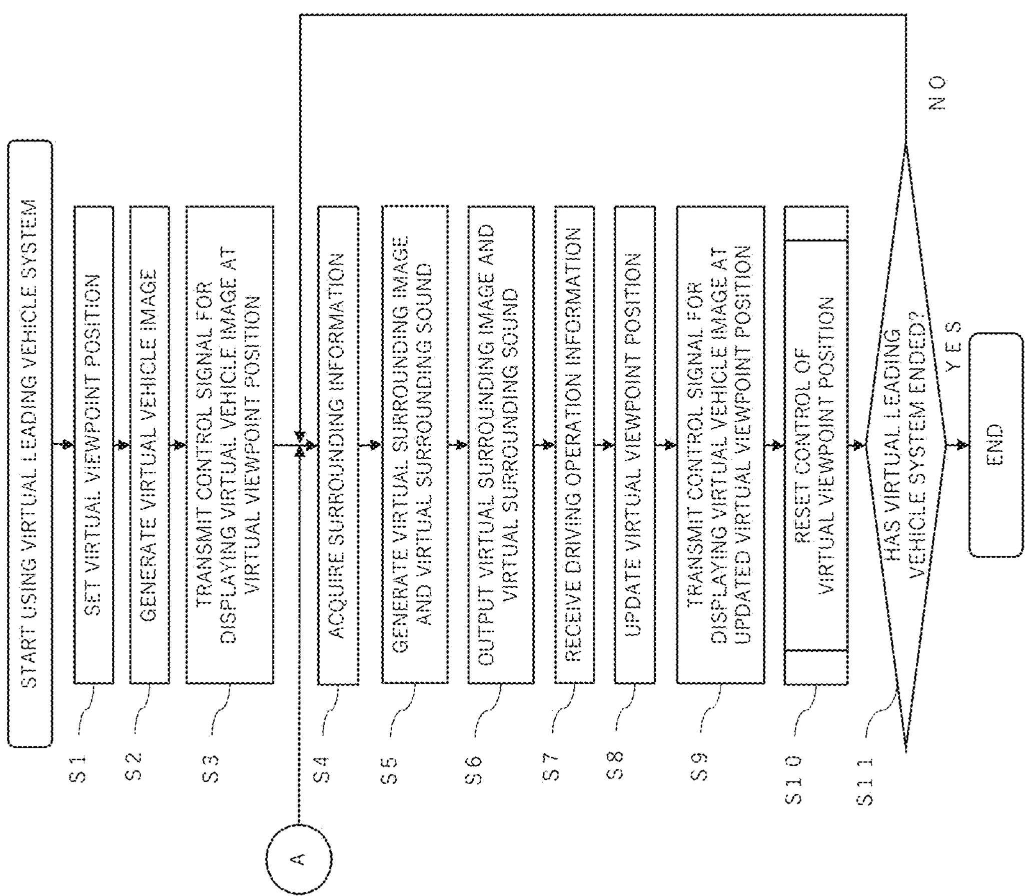
FIG. 3 is a flowchart illustrating an example of the procedure of an information processing method in the information processing device of the present embodiment.

An embodiment of an information processing device according to the present invention will be described with reference to the drawings. FIG. 1 is a block diagram illustrating an example of the configuration of an information processing system 10 including the information processing device 100 according to the present embodiment. As illustrated in FIG. 1, the information processing system 10 includes the information processing device 100, a vehicle 200, and a terminal device 300 in the present embodiment. The information processing device 100 is a server capable of communicating with the vehicle 200 and the terminal device 300 to exchange information. The information processing device 100 transmits to the vehicle 200 driving assistance information for assisting a first user who manually drives the vehicle 200, and transmits to the terminal device 300 information on the surrounding environment at a position ahead of the vehicle 200 in the traveling direction. The terminal device 300 is located in a remote space away from the vehicle 200. For example, the remote space is a control center that manages multiple vehicles. At the control center, the terminal device 300 outputs information on the surrounding environment ahead of the vehicle 200 to a second user through a second information output device 340.

The second user is an operator of the control center, and provides the first user with driving assistance information on a driving operation of the vehicle 200 while checking information on the surrounding environment at a position ahead of the vehicle 200. For example, a way of providing the first user with the driving assistance information includes a method of displaying a virtual vehicle image representing a virtual vehicle traveling ahead of the vehicle 200 on the windshield of the vehicle 200 so as to be superimposed on the real scenery outside the vehicle. The second user guides the vehicle 200 by steering the virtual vehicle so that the movement of the virtual vehicle provides driving guidance to the first user. Since the second user steers the virtual vehicle in response to changes in the traveling circumstances while viewing the surrounding environment at a position ahead of the vehicle 200 in the traveling direction, the first user can be provided with the necessary driving details at the position ahead of the vehicle 200 in the traveling direction. On the other hand, the first user steers the vehicle 200 while viewing the movement of the virtual vehicle displayed on the windshield of the vehicle 200. This enables the first user to follow the movement of the virtual vehicle to drive the vehicle in response to changes in the traveling circumstances without delay. Further, in the present embodiment, the driving assistance information is not limited to the virtual vehicle image, and may be voice guidance by the second user. Further, in the present embodiment, the information processing device 100 may be applied to a device mounted on the vehicle 200 or the terminal device 300.

The information processing device 100 includes a controller 110 and a communication device 120. The controller 110 includes a computer having hardware and software, and this computer includes a read only memory (ROM) that stores a program, a central processing unit (CPU) that executes the program stored in the ROM, and a random access memory (RAM) that functions as an accessible storage device. Note that the operable circuits to be used include, instead of or together with the CPU, a micro processing unit (MPU), a digital signal processor (DSP), an application specific integrated circuit (ASIC), a field programmable gate array (FPGA), and the like.

The controller 110 includes at least, as functional blocks, a surrounding information acquisition unit 111, a virtual viewpoint position setting unit 112, an image generation unit 113, a sound information generation unit 114, a transmission unit 115, a reception unit 116, and a driving assistance information control unit 117, and executes these functions in cooperation with software and hardware for implementing each function or executing each process described above. Specifically, the controller 110 first acquires surrounding information of the surrounding environment of the vehicle 200 and sets a virtual viewpoint position ahead of the vehicle 200 in the traveling direction. Next, the controller 110 uses the surrounding information and generates virtual surrounding information indicating the surrounding environment at the virtual viewpoint position, and transmits to the terminal device 300 a control signal for outputting the virtual surrounding information to the second user through the second information output device 340. The controller 110 then receives driving operation information input to an input device 320 and generates a control signal for outputting driving assistance information generated based on the driving operation information. Specifically, the controller 110 generates a control signal for displaying the virtual vehicle image so as to be superimposed on the real scenery of the surrounding environment of the vehicle 200 through a first information output device 240. Note that, in the present embodiment, the functions of the controller 110 are divided into seven blocks, and the function of each functional block will be described. However, the functions of the controller 110 do not necessarily have to be divided into seven blocks, and may be divided into six or less functional blocks or eight or more functional blocks.

The surrounding information acquisition unit 111 acquires surrounding information of the surrounding environment of the vehicle 200. The surrounding information includes a surrounding image obtained by capturing the surrounding environment of the vehicle 200, sound information in the surrounding environment of the vehicle 200, and information on distances and directions to objects in the vicinity of the vehicle 200. Specifically, the surrounding information acquisition unit 111 acquires a surrounding image of the vehicle 200 captured by a captured image acquisition unit 222 of the vehicle 200. The surrounding information acquisition unit 111 may acquire, from another vehicle located in the vicinity of the vehicle 200, surrounding images of the vehicle 200 captured by a sensor group of the other vehicle. The surrounding information acquisition unit 111 may acquire a surrounding image of the vehicle 200 captured by an infrastructure sensor. The infrastructure sensor is a device that is installed along the road on which the vehicle 200 is traveling and detects environmental information around the infrastructure sensor. Further, the surrounding information acquisition unit 111 is not limited to acquiring both a surrounding image and sound information, and may acquire only a surrounding image.

Further, the surrounding information acquisition unit 111 acquires sound information in the surrounding environment of the vehicle 200. Specifically, the surrounding information acquisition unit 111 acquires sound information around the vehicle 200 acquired by an external sound acquisition unit 223 of the vehicle 200. The surrounding information acquisition unit 111 may acquire, from another vehicle located in the vicinity of the vehicle 200, sound information detected by a sensor group of the other vehicle. The surrounding information acquisition unit 111 may acquire sound information around the vehicle 200 detected by an infrastructure sensor.

Further, the surrounding information acquisition unit 111 acquires information on distances and directions to objects located in the vicinity of the vehicle 200. Specifically, the surrounding information acquisition unit 111 acquires information on distances and directions to objects in the vicinity of the vehicle 200 detected by an object detection unit 224 of the vehicle 200. The objects include other vehicles, bicycles, pedestrians, traffic restrictions, construction sites, and the like, which are located in the vicinity of the vehicle 200. The distance and direction of an object are the distance between the vehicle 200 and the object and the direction from the vehicle 200 to the object, respectively. The surrounding information acquisition unit 111 may acquire, from another vehicle located in the vicinity of the vehicle 200, information on the distance and direction of an object detected by a sensor group of the other vehicle. The surrounding information acquisition unit 111 may acquire information on the distance and direction of an object in the vicinity of the vehicle 200 detected by an infrastructure sensor.

The virtual viewpoint position setting unit 112 sets a virtual viewpoint position ahead of the vehicle 200 in the traveling direction. The virtual viewpoint position is a virtual viewpoint position to be set in the surrounding environment of the vehicle 200. The virtual viewpoint position is also the position of a virtual vehicle in the surrounding environment of the vehicle 200. For example, the virtual viewpoint position is a position corresponding to the position of the driver's seat of the virtual vehicle. The second user can view the surrounding environment of the virtual vehicle from the virtual viewpoint position. The virtual viewpoint position is set as a coordinate position in real space with the position of the vehicle 200 as a reference. In the present embodiment, when the first user who is the driver of the vehicle 200 activates a virtual leading vehicle system, the virtual viewpoint position setting unit 112 sets an initial set position as the virtual viewpoint position. The initial set position is a position defined in advance, for example, a position ahead of the vehicle 200 in the traveling direction and at a first predetermined distance from the vehicle 200.

Further, the virtual viewpoint position setting unit 112 updates the virtual viewpoint position based on movement instruction information. The movement instruction information is information for causing the second user to move the virtual vehicle. The movement instruction information includes information on steering, accelerator, and brake operations of the virtual vehicle. The movement instruction information is output to the controller 110 via the terminal device 300 at fixed intervals. For example, the movement instruction information is steering operation information output when the second user performs a steering operation. Further, for example, when the second user continues to maintain the vehicle speed of the virtual vehicle at a constant speed, the movement instruction information is accelerator operation information for maintaining the vehicle speed at the constant speed. Further, the movement instruction information may be information regarding the specification of a position through which the virtual vehicle is to pass. For example, when the second user specifies positions through which the virtual vehicle is to pass as a plurality of points on a map showing the surroundings of the virtual vehicle, information on the positions specified as the points is output as the movement instruction information. The virtual viewpoint position setting unit 112 updates the virtual viewpoint position corresponding to the position of the virtual vehicle based on the movement instruction information for the virtual vehicle. Specifically, the virtual viewpoint position setting unit 112 calculates, based on the position of the virtual viewpoint position and the movement instruction information, a position of the virtual viewpoint position after a predetermined time (for example, after one second), and updates the virtual viewpoint position to the calculated virtual viewpoint position after the predetermined time. For example, the virtual viewpoint position setting unit 112 first calculates, based on vehicle speed information and steering angle information of the vehicle 200 acquired as the movement instruction information, a moving distance and a moving direction after the predetermined time. Next, the virtual viewpoint position setting unit 112 calculates as the virtual viewpoint position after the predetermined time a position moved by the movement distance in the movement direction from the current virtual viewpoint position as a reference. Then, the virtual viewpoint position setting unit 112 updates the virtual viewpoint position to the calculated virtual viewpoint position after the predetermined time.

Further, the virtual viewpoint position setting unit 112 resets the virtual viewpoint position when a predetermined condition is satisfied. In the present embodiment, in parallel with the above-described control for updating the virtual viewpoint position based on the movement instruction information from the second user, a determination control is performed using a predetermined condition for resetting the virtual viewpoint position. Specifically, the virtual viewpoint position setting unit 112 determines at fixed intervals whether or not a predetermined condition is satisfied, and when determining that the predetermined condition is satisfied, the virtual viewpoint position setting unit 112 resets the virtual viewpoint position. After the resetting, the virtual viewpoint position setting unit 112 continues the control for updating the virtual viewpoint position with the reset virtual viewpoint position as the current virtual viewpoint position. For example, when the predetermined condition is satisfied, the virtual viewpoint position setting unit 112 resets the virtual viewpoint position to a position ahead of the vehicle 200 in the traveling direction and at a first predetermined distance from the vehicle 200. When the virtual viewpoint position is reset by the virtual viewpoint position setting unit 112, virtual surrounding information to be output to the second user is generated based on the reset virtual viewpoint position, and the position of the virtual vehicle image displayed to the first user is updated. Further, in the present embodiment, the virtual viewpoint position is set at a position at a first predetermined distance from the vehicle 200 in resetting. However, in resetting, a distance other than the first predetermined distance may be set instead of the first predetermined distance which is the same as in the initial setting.

The predetermined condition for resetting the virtual viewpoint position to be used for determination by the virtual viewpoint position setting unit 112 is specifically, when the virtual viewpoint position is at a second predetermined distance or more from the vehicle 200, when the virtual viewpoint position is not located on the road on which the vehicle 200 is traveling, or when the driver inputs command information for resetting the virtual viewpoint position. For example, since the second user can control the virtual vehicle independently of the movement of the vehicle 200, there is a possibility that the vehicle 200 cannot catch up with the movement of the virtual vehicle. when the distance between the virtual vehicle and the vehicle 200 increases, driving the virtual vehicle may not be helpful for the driver of the vehicle 200. Therefore, the virtual viewpoint position setting unit 112 determines whether or not the virtual viewpoint position, that is, the position of the virtual vehicle is at the second predetermined distance or more from the vehicle 200. When determining that the virtual viewpoint position is at the second predetermined distance or more from the vehicle 200, the virtual viewpoint position setting unit 112 resets the virtual viewpoint position to a position within the first predetermined distance from the vehicle 200. Specifically, the virtual viewpoint position setting unit 112 calculates, based on the position information of the vehicle 200 and the position information of the virtual viewpoint position, a distance between the vehicle 200 and the virtual viewpoint position, and determines whether or not the distance between the vehicle 200 and the virtual viewpoint position is equal to or greater than the second predetermined distance. When determining that the distance between the vehicle 200 and the virtual viewpoint position is equal to or greater than the second predetermined distance, the virtual viewpoint position setting unit 112 resets the virtual viewpoint position to a position ahead of the vehicle 200 in the traveling direction and at the first predetermined distance from the vehicle 200. Further, when determining that the distance between the vehicle 200 and the virtual viewpoint position is equal to or greater than the second predetermined distance, the virtual viewpoint position setting unit 112 may limit the moving speed of the virtual viewpoint position so that the virtual viewpoint position is within the first predetermined distance from the vehicle 200. Specifically, the virtual viewpoint position setting unit 112 outputs to the terminal device 300 a speed limit signal for limiting the speed that can be input by the second user to a speed lower than a predetermined speed. For example, when the vehicle 200 is traveling at a speed of 50 km/h, the virtual viewpoint position setting unit 112 limits the vehicle speed that can be input by the second user to a speed lower than 50 km/h. Further, in the present embodiment, the first predetermined distance and the second predetermined distance are preset values. For example, the first predetermined distance is set as a distance shorter than the second predetermined distance.

Further, in the present embodiment, when the virtual viewpoint position is not located on the road on which the vehicle 200 is traveling, the virtual viewpoint position setting unit 112 resets the virtual viewpoint position. This is because, even when the virtual vehicle is located within the second predetermined distance from the vehicle 200, the driving of the virtual vehicle when traveling on a road different from the road on which the vehicle 200 is traveling will not help the driver of the vehicle 200. For example, when a travel route for the vehicle 200 is set, roads that are not on the travel route correspond to different roads. Therefore, the virtual viewpoint position setting unit 112 determines whether or not the virtual viewpoint position is located on a road different from the road on which the vehicle 200 is traveling, and when determining that the virtual viewpoint position is located on a road different from the road on which the vehicle 200 is traveling, the virtual viewpoint position setting unit 112 resets the virtual viewpoint position to the initial set position. Specifically, based on map information, the position information of the vehicle 200, and the position information of the virtual viewpoint position, the virtual viewpoint position setting unit 112 determines whether or not the virtual viewpoint position is located on a road different from the road on which the vehicle 200 is traveling. For example, the virtual viewpoint position setting unit 112 acquires road link information from the map information, and determines whether or not the link on which the vehicle 200 is located is different from the link on which the virtual viewpoint position is located. Then, when determining that the link on which the vehicle 200 is located is different from the link on which the virtual viewpoint position is located, the virtual viewpoint position setting unit 112 determines that the virtual viewpoint position is located on a road different from the road on which the vehicle 200 is traveling, and resets the virtual viewpoint position to a position ahead of the vehicle 200 in the traveling direction and at the first predetermined distance from the vehicle 200.

Further, when the driver inputs command information for resetting the virtual viewpoint position, the virtual viewpoint position setting unit 112 resets the virtual viewpoint position. This is because, when the virtual vehicle moves away while the vehicle 200 is traveling, the driver may wish to reset the position of the virtual vehicle. Therefore, the virtual viewpoint position setting unit 112 determines whether or not the driver has input information regarding the resetting of the position of the virtual vehicle, and when determining that the driver has input information related to resetting the position of the virtual vehicle, the virtual viewpoint position setting unit 112 resets the virtual viewpoint position to the default position. Specifically, when the virtual viewpoint position setting unit 112 receives command information regarding the resetting of the virtual viewpoint position from the vehicle 200 via the communication device 120, the virtual viewpoint position setting unit 112 determines that the driver has input information regarding the resetting of the position of the virtual vehicle. Then, when determining that the driver has input the information regarding the resetting of the position of the virtual vehicle, the virtual viewpoint position setting unit 112 resets the virtual viewpoint position to a position ahead of the vehicle 200 in the traveling direction and at the first predetermined distance from the vehicle 200.

The image generation unit 113 generates a virtual surrounding image representing the surrounding environment of the virtual viewpoint position. In other words, the virtual surrounding image is an image representing the surrounding environment at the position of the virtual vehicle. Displaying the virtual surrounding image allows the second user to visually recognize the surrounding environment as if the second user sat in the driver's seat of the virtual vehicle. The image generation unit 113 first acquires three-dimensional space information of the surrounding environment with the vehicle 200 as a reference, calculates a virtual viewpoint position in the three-dimensional space of the surrounding environment, and generates a virtual surrounding image at the virtual viewpoint position by using the surrounding image of the vehicle 200. The three-dimensional space information is acquired as three-dimensional space information of the surrounding environment with the position of the vehicle 200 as a reference based on the position information of the vehicle 200 and three-dimensional map information. As the three-dimensional space information, an estimated position of the vehicle 200 and three-dimensional environmental map of the surrounding environment of the vehicle 200 may be generated in real time by using SLAM, based on sensor information acquired by a sensor group 220 of the vehicle 200. Further, the image generation unit 113 may generate a virtual surrounding image at the virtual viewpoint position by means of light field rendering technique. Specifically, the image generation unit 113 acquires light ray information of the surrounding environment of the vehicle 200 from surrounding images of the surrounding environment of the vehicle 200 captured by cameras at a plurality of viewpoints, and synthesizes an image at the virtual viewpoint position based on the information on the light rays reaching the virtual viewpoint position to generate a virtual surrounding image.

Figures 2A, 2B:
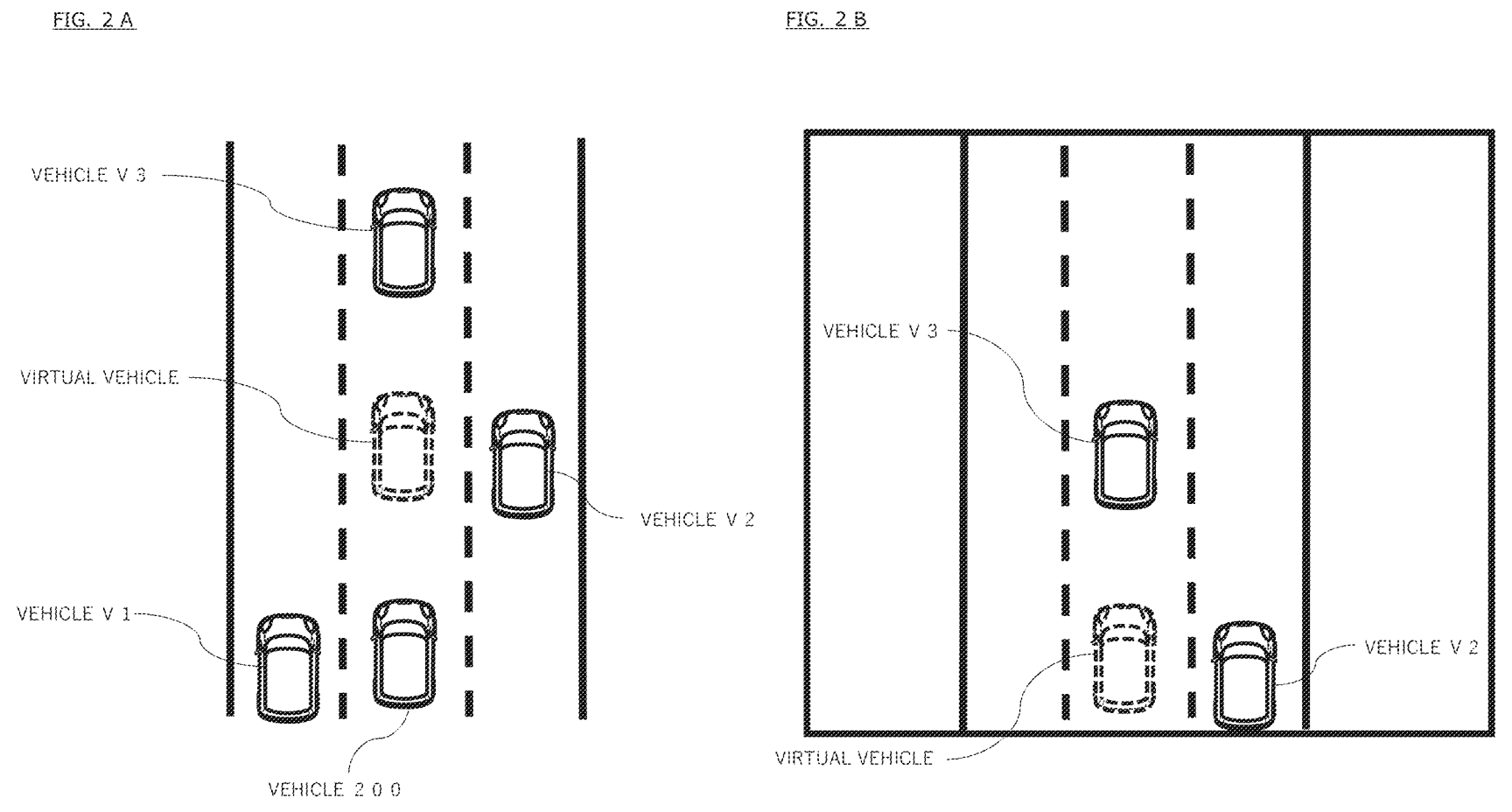

Further, the image generation unit 113 may generate a bird's-eye view image that is a bird's-eye view of the surrounding environment at the virtual viewpoint position. From the distances between the virtual viewpoint position and objects in the vicinity of the virtual viewpoint position, and the directions of the positions of the objects with respect to the virtual viewpoint position, which are acquired by the surrounding information acquisition unit 111, the image generation unit 113 generates the bird's-eye view image representing a positional relationship between the virtual viewpoint position and the objects. FIG. 2A is an example representing the surrounding environment of the vehicle 200. Further, FIG. 2B is a diagram illustrating an example of a bird's-eye view image representing the surrounding environment of a virtual vehicle in the surrounding environment of the vehicle 200 illustrated in FIG. 2A. In other words, FIG. 2B represents a bird's-eye view image generated based on information of detecting vehicles traveling in the vicinity of the vehicle 200. As illustrated in FIG. 2A, a vehicle V1, a vehicle V2, and a vehicle V3 are traveling in the vicinity of the vehicle 200. For the first user, the virtual vehicle is displayed as if it were traveling ahead of the vehicle 200 in the traveling direction. In the example of FIG. 2A, the vehicle 200 detects the vehicle V1, the vehicle V2, and the vehicle V3. FIG. 2B is an image displayed to the second user who steers the virtual vehicle, in which the virtual vehicle and the vehicles V2 and V3 traveling ahead of and to the side of the virtual vehicle, respectively, are displayed. The second user can grasp a positional relationship between the virtual vehicle and the surrounding objects by viewing the bird's-eye view image. Further, the bird's-eye view image may be an image including the position of the vehicle 200 and the position of the virtual vehicle. Further, the bird's-eye view image may be generated by viewpoint conversion using the surrounding image of the vehicle 200.

The sound information generation unit 114 generates a virtual ambient sound. The virtual ambient sound is a virtual sound heard from the surrounding environment at the virtual viewpoint position. The sound information generation unit 114 sets the position of a virtual sound source so as to correspond to the position of a sound source in the surrounding environment based on the sound information of the surrounding environment of the vehicle 200 acquired by the external sound acquisition unit 223, and performs sound signal processing on a virtual sound so as to localize a sound image of the virtual sound at the position of the virtual sound source. The sound information generation unit 114 outputs the sound information generated by the sound signal processing to the communication device 120. Further, in the present embodiment, the image generation unit 113 may generate only the virtual image without the virtual ambient sound being generated by the sound information generation unit 114.

The transmission unit 115 transmits a control signal for outputting the information generated by the image generation unit 113 and the sound information generation unit 114 to the vehicle 200 and the terminal device 300 via the communication device 120. Specifically, the transmission unit 115 transmits to a terminal communication device 330 a control signal for controlling the second information output device 340 to output the virtual surrounding information including the virtual surrounding image and the virtual ambient sound information. Further, the transmission unit 115 transmits to the vehicle 200 a control signal for controlling the first information output device 240 to output the virtual vehicle image generated by the image generation unit 113 and sound information regarding driving guidance input by the second user.

The reception unit 116 receives driving operation information input to the input device 320 by the second user. The driving operation information is information on a driving operation of the vehicle 200. Specifically, the driving operation information includes movement instruction information for the second user to move the position of the virtual vehicle (virtual viewpoint position). Accordingly, the second user provides information necessary for driving operation of the vehicle 200 by moving the virtual vehicle displayed to the first user. For example, when there is an obstacle on the left side, the second user can inform the first user that a driving operation is required to move the virtual vehicle to the right side to move the vehicle 200 to the right side accordingly. Further, the driving operation information may include device control information regarding the control of on-vehicle devices of the virtual vehicle. For example, the second user inputs device control information for turning on the brake lamps to provide the first user with information that a driving operation is required to stop the vehicle 200. Further, the reception unit 116 receives, as the driving operation information, sound information regarding driving guidance input by the second user from the terminal device 300.

The driving assistance information control unit 117 generates driving assistance information for assisting driving of the vehicle 200 and generates a control signal for outputting the driving assistance information to the first user through the first information output device 240. Specifically, first, the driving assistance information control unit 117 generates a virtual vehicle image. The virtual vehicle image is composed of, for example, a 3D object of a vehicle. The virtual vehicle image includes images of on-vehicle devices such as steering lamps and brake lamps. When the driver of the vehicle 200 activates the virtual leading vehicle system, the driving assistance information control unit 117 generates a virtual vehicle image. Further, the driving assistance information control unit 117 generates an image in which the on-vehicle devices of the virtual vehicle are operating based on device control information. For example, when the device control information for turning on a brake lamp is input, the driving assistance information control unit 117 generates an image of a virtual vehicle with the brake lamp turned on. Further, in the present embodiment, the driving assistance information control unit 117 may generate a virtual image of another object, which is not limited to the image of the virtual vehicle. For example, the driving assistance information control unit 117 may generate a virtual image of an arrow indicating the traveling direction of the vehicle 200.

Next, the driving assistance information control unit 117 generates a control signal for displaying the virtual vehicle image so as to be superimposed at the virtual viewpoint position set by the virtual viewpoint position setting unit 112. The setting of the virtual viewpoint position includes setting to the initial set position, updating the virtual viewpoint position, and resetting the virtual viewpoint position. Further, when a virtual vehicle image representing a virtual vehicle in which an in-vehicle device is operating is generated based on the device control information, the driving assistance information control unit 117 generates a control signal for displaying the virtual vehicle image so as to be superimposed at the virtual viewpoint position. Further, the driving assistance information control unit 117 may generate sound information regarding driving assistance based on sound information of the second user received by the reception unit 116. When the driving assistance information control unit 117 generates the sound information regarding driving assistance, the driving assistance information control unit 117 generates a control signal for outputting the sound information from a sound output device 242 of the first information output device 240. Further, when there is an obstacle that shields the virtual vehicle from the field of view of the first user between the vehicle 200 and the virtual viewpoint position, the driving assistance information control unit 117 generates a control signal for displaying an image of the obstacle so as to be superimposed on the virtual vehicle image. Examples of the obstacle include other vehicles and buildings. Specifically, the driving assistance information control unit 117 determines whether or not there is an obstacle between the vehicle 200 and the virtual viewpoint position, based on the anteroposterior relationship between the virtual viewpoint position and the obstacle, estimated from the surrounding image including depth information. Then, when determining that there is an obstacle between the vehicle 200 and the virtual viewpoint position, the driving assistance information control unit 117 generates a control signal for displaying an image of the obstacle so as to be superimposed on the virtual vehicle image at the position of the obstacle.

The communication device 120 communicates with an in-vehicle communication device 230 of the vehicle 200 and the terminal communication device 330 of the terminal device 300 to exchange information. Specifically, the communication device 120 transmits virtual surrounding information to the terminal device 300 and receives driving operation information from the terminal device 300. Further, the communication device 120 receives surrounding information of the vehicle 200 from the in-vehicle communication device 230 and transmits driving assistance information to the in-vehicle communication device 230.

Next, the vehicle 200 will be described. The vehicle 200 includes an in-vehicle controller 210, the sensor group 220, the in-vehicle communication device 230, the first information output device 240, an input device 250, and a map database 260. The in-vehicle controller 210 controls the functions of the devices and sensors of the vehicle 200. Specifically, the in-vehicle controller 210 acquires sensor information from the sensor group 220 and outputs it to the in-vehicle communication device 230. Further, the in-vehicle controller 210 outputs the driving assistance information transmitted from the information processing device 100 to the first information output device 240.

The sensor group 220 acquires information on the surrounding environment of the vehicle. The sensor group 220 includes a position information acquisition unit 221, the captured image acquisition unit 222, the external sound acquisition unit 223, the object detection unit 224, and a map information acquisition unit 225. The position information acquisition unit 221 detects the current position of the vehicle 200. The position information acquisition unit 221 is, for example, GPS, and acquires the position information of the own vehicle by receiving radio waves transmitted from a plurality of communication satellites with a receiver. Further, the position information acquisition unit 221 can detect changes in the position information of the own vehicle by receiving radio waves periodically transmitted from the plurality of communication satellites. The captured image acquisition unit 222 captures an image of the traveling environment around the vehicle 200. The captured image acquisition unit 222 is a well-known imaging device that includes an imaging element such as a so-called CCD or CMOS, an optical lens, an optical filter, and peripheral electronic circuits such as a power supply, and captures an image with the imaging element. The captured image acquisition unit 222 is disposed to capture an image of the surrounding environment of the vehicle 200. For example, the captured image acquisition unit 222 includes a plurality of cameras arranged on the front, rear, left, and right of the vehicle 200, and captures images of the scenery outside the vehicle in various directions. The captured image acquisition unit 222 may acquire a surrounding image including depth information. Further, the captured image acquisition unit 222 repeatedly captures surrounding images at predetermined intervals. The captured image acquisition unit 222 transmits the captured image to the in-vehicle controller 210.

The external sound acquisition unit 223 collects sounds in the surrounding environment of the vehicle 200. The external sound acquisition unit 223 is, for example, a microphone array in which a plurality of microphones are installed outside the vehicle. The external sound acquisition unit 223 acquires spatial sound information and estimates the direction of the sound source. The external sound acquisition unit 223 transmits to the in-vehicle controller 210 ambient sound information in which the collected ambient sounds are converted into audio signals. The object detection unit 224 detects objects in the vicinity of the vehicle 200. The object detection unit 224 irradiates the surroundings of the vehicle 200 with, for example, millimeter waves or ultrasonic waves to scan a predetermined range around the vehicle 200 to detect objects located in the vicinity of the vehicle 200. The objects include other vehicles, bicycles, pedestrians, traffic restrictions, construction sites, and the like, which are located in the vicinity of the vehicle 200. The object detection unit 224 detects the relative position (azimuth) between an object and the vehicle 200 and the distance between the object and the vehicle 200. The map information acquisition unit 225 acquires map information including the surrounding environment of the vehicle 200. Specifically, based on the position information of the vehicle 200 acquired by the position information acquisition unit 221, the map information acquisition unit 225 acquires map information including the surrounding environment of the vehicle 200 from the map database 260. The map information acquisition unit 225 may acquire map information from an external map database. The map information acquired by the map information acquisition unit 225 is output to the in-vehicle controller 210.

The in-vehicle communication device 230 communicates with the communication device 120 to exchange information. Specifically, the in-vehicle communication device 230 receives driving assistance information from the communication device 120 and transmits sensor information and map information to the communication device 120.

The first information output device 240 outputs image information and sound information to the first user. The first information output device 240 includes an image display device 241 and the sound output device 242. The first information output device 240 is, for example, an AR head-mounted display. Through the first information output device 240, the first user can visually recognize augmented reality (AR) in which the image of the virtual vehicle is superimposed on the real scenery. The image display device 241 displays the virtual vehicle image so as to be superimposed at the virtual viewpoint position on the real scenery of the surrounding environment of the vehicle 200. The image display device 241 is, for example, a transmissive display. Further, the image display device 241 is not limited to the display of the AR head-mounted display, and may be the windshield of the vehicle 200. Further, the sound output device 242 outputs sound information of the second user. The sound output device 242 is, for example, headphones provided in the AR head-mounted display or speakers mounted in the vehicle 200.

The input device 250 is a device to be operated by the first user, and is used by the first user to reset the virtual viewpoint position in the vicinity of the vehicle 200. The input device 250 is, for example, a touch panel disposed on a display, or a device capable of manual input such as through a switch button or a joystick. The first user is allowed to input instruction information to the input device 250 to reset the position of the virtual vehicle in the vicinity of the vehicle 200.

The map database 260 stores in advance map information including information such as road information. The map database 260 includes, for example, two-dimensional map information and three-dimensional map information. The three-dimensional map information is map information including three-dimensional information such as land elevations and building heights. Further, the 3D map information may be information including a 3D shape model of landforms or buildings on a map, or information including a model in which images of landforms or buildings as textures are added to a shape model.

The terminal device 300 is a device to be used by the second user in a remote space, and outputs images and sounds representing the surrounding environment at the position of the virtual vehicle. The terminal device 300 may be installed in the remote space, for example. The terminal device 300 includes a terminal controller 310, the input device 320, the terminal communication device 330, and the second information output device 340. The terminal controller 310 controls the functions of the devices of the terminal device 300. Specifically, when the second user inputs sound information to the input device 320, the terminal controller 310 outputs to the terminal communication device 330 a control signal for transmitting the sound information to the information processing device 100. Further, the terminal controller 310 outputs a control signal for controlling the second information output device 340 to output the information received by the terminal communication device 330 to the second user.

The input device 320 is a device to be operated by the second user, and is used by the second user to input driving operation information. Specifically, the input device 320 is a steering device for a virtual vehicle, and includes switches corresponding to a steering wheel, an accelerator, a brake, a lamp switch, and the like, for example. The steering device may have the shape and structure of a general steering wheel, accelerator pedal, or the like of a vehicle, or may use a joystick or the like. In response to an operation of the second user on the steering device, the content of the operation is input to the input device 320 as driving operation information. The driving operation information includes movement instruction information for moving the virtual vehicle and device control information for controlling in-vehicle devices of the virtual vehicle. For example, in response to an operation of the second user on the steering wheel of the steering device, steering angle information is input to the input device 320 as movement instruction information for the virtual vehicle. Further, when the second user performs an operation on an in-vehicle device such as a brake lamp, operation information for the in-vehicle device is input to the input device 320 as device control information. Further, the input device 320 may receive an input of sound information as driving operation information. For example, the input device 320 includes a microphone that picks up a voice uttered by the second user. When the second user utters a voice, the corresponding sound information of the second user is input to the input device 320.

In the present embodiment, operations of the second user on the virtual vehicle are restricted to operations that can be mechanically and physically performed on the real vehicle. For example, an operation to instantly change the vehicle speed of the virtual vehicle from 40 km to 60 km or an operation to instantly move the position of the virtual vehicle to an adjacent lane is disabled. This allows the virtual vehicle to move within a mechanically and physically possible range. Further, operations of the second user on the virtual vehicle are restricted to operations that comply with traffic regulations. Further, when the input device 320 receives a speed limit signal from the controller 110, the input device 320 limits the vehicle speed that can be input by the second user to a predetermined speed or less.

The terminal communication device 330 communicates with the information processing device 100 and the in-vehicle communication device 230 of the vehicle 200 to exchange information. Specifically, the terminal communication device 330 receives the virtual surrounding information from the information processing device 100 and transmits driving operation information to the information processing device 100.

The second information output device 340 is a device that outputs information on the surrounding environment at the virtual viewpoint position to the second user. The second information output device 340 is, for example, a glasses-type or goggles-type VR head-mounted display, and is worn on the head of the second user. The second user can visually recognize virtual reality (VR) in which the surrounding environment at the position of the virtual vehicle is displayed through the terminal device 300. The second information output device 340 outputs a virtual surrounding image representing the surrounding environment at the virtual viewpoint position and virtual ambient sound information representing an ambient sound at the virtual viewpoint position. This makes it possible for the second user to view the scenery as if the user were in the virtual vehicle, and hear the sound as if the user were in the virtual vehicle. The second information output device 340 includes an image display device 341 and a sound output device 342. The image display device 341 is, for example, a non-transmissive display. The sound output device 342 is, for example, headphones or speakers. The image display device 341 displays the virtual surrounding image generated by the image generation unit 113. This makes it possible for the second user to view the surrounding environment of the virtual vehicle at the virtual viewpoint position through the display on which the virtual surrounding image is displayed. The sound output device 342 outputs the virtual ambient sound information. This makes it possible for the second user to hear sounds around the virtual vehicle at the virtual viewpoint position through headphones.

Next, the procedure of the information processing method in the information processing device according to the present embodiment will be described with reference to FIGS. 3 and 4. FIG. 3 is a flowchart illustrating the procedure of the information processing method in the information processing device according to the present embodiment. FIG. 4 is a flowchart illustrating a control flow for resetting the virtual viewpoint position, which is the position of the virtual vehicle image, and illustrates the control flow in step S10 of FIG. 3. In the present embodiment, when the first user of the vehicle 200 activates the virtual leading vehicle system to start using it, information processing according to the present embodiment starts from step S1. Further, in the present embodiment, the control flow of FIG. 4 is executed after step S9. However, the control flow of FIG. 4 may be executed between steps of FIG. 3. In this case, an update control of the virtual viewpoint position in FIG. 3 and a determination control related to the reset control of the virtual viewpoint position in FIG. 4 are executed in parallel.

In step S1, the controller 110 sets an initial set position as the virtual viewpoint position. The initial set position is a position ahead of the vehicle 200 in the traveling direction and at the first predetermined distance from the vehicle 200. In step S2, the controller 110 generates a virtual vehicle image representing the virtual vehicle. In step S3, the controller 110 transmits to the vehicle 200 a control signal for controlling the image display device 241 to display the virtual vehicle image so as to be superimposed at the virtual viewpoint position on the real scenery of the surrounding environment of the vehicle 200.

In step S4, the controller 110 acquires surrounding information of the surrounding environment of the vehicle 200. Specifically, the controller 110 acquires a surrounding image and an ambient sound of the surrounding environment of the vehicle 200, which are detected by the sensor group 220 of the vehicle 200. In step S5, the controller 110 generates a virtual surrounding image and a virtual ambient sound based on the surrounding information acquired in step S4. In step S6, the controller 110 outputs to the terminal device 300 the virtual surrounding image and the virtual ambient sound, which are generated in step S5.

In step S7, the controller 110 receives the driving operation information transmitted from the terminal device 300. Specifically, the controller 110 receives, as the driving operation information, the position of the virtual vehicle, that is, the movement instruction information of the virtual viewpoint position and the device control information of in-vehicle devices of the virtual vehicle. The driving operation information is information input to the input device 320 of the terminal device 300 by the second user. In step S8, the controller 110 updates the virtual viewpoint position based on the movement instruction information received as the driving operation information in step S7. In step S9, the controller 110 transmits a control signal for displaying the virtual vehicle image at the updated virtual viewpoint position. Specifically, the controller 110 displays the virtual vehicle image so that the position of the virtual vehicle image is moved according to the movement of the virtual viewpoint position. This makes it possible to move the virtual vehicle image displayed to the first user according to the second user's steering of the virtual vehicle, so that the first user can view the virtual vehicle as if it were traveling ahead of the vehicle 200.

In step S10, the controller 110 performs the reset control of the virtual viewpoint position. After the control in step S9, the controller 110 executes the control flow illustrated in FIG. 4.

First, in step S101, the controller 110 acquires the distance between the virtual viewpoint position and the vehicle 200. Specifically, the controller 110 acquires a distance between the virtual viewpoint position and the vehicle 200 from the position information of the virtual viewpoint position and the position information of the vehicle 200. In step S102, the controller 110 determines whether or not the virtual viewpoint position is at the second predetermined distance or more from the vehicle 200. Specifically, the controller 110 determines whether or not the distance between the virtual viewpoint position acquired in step S101 and the vehicle 200 is equal to or greater than the second predetermined distance. When determining that the virtual viewpoint position is at the second predetermined distance or more from the vehicle 200, the processing proceeds to step S106. When not determining that the virtual viewpoint position is at the second predetermined distance or more from the vehicle 200, the processing proceeds to step S103.

In step S103, the controller 110 acquires the virtual viewpoint position and the position of the vehicle on the map. Specifically, the controller 110 identifies the virtual viewpoint position and on which road on the map the vehicle 200 is located, based on the map information acquired from the map database 260, thereby acquiring the virtual viewpoint position and the position of the vehicle on the map. In step S104, the controller 110 determines whether or not the virtual viewpoint position is located on a road different from the road on which the vehicle 200 is traveling. When determining that the virtual viewpoint position is located on a road different from the road on which the vehicle 200 is traveling, the processing proceeds to step S106. When not determining that the virtual viewpoint position is located on a road different from the road on which the vehicle 200 is traveling, the processing proceeds to step S105.

In step S105, the controller 110 determines whether or not the first user has reset the virtual viewpoint position. Specifically, when the controller 110 receives command information for resetting the virtual viewpoint position, transmitted from the terminal device 300, the controller 110 determines that the first user has reset the virtual viewpoint position. When determining that the first user has reset the virtual viewpoint position, the processing proceeds to step S106. When not determining that the first user has reset the virtual viewpoint position, the processing proceeds to step S11 illustrated in FIG. 3.

In step S106, the controller 110 resets the virtual viewpoint position to a position within the first predetermined distance from the vehicle 200. After the resetting, the controller 110 executes the control flow from step S4 illustrated in FIG. 3.

In step S11, the controller 110 determines whether or not the virtual leading vehicle system has ended. When determining that the virtual leading vehicle system has ended, the flow ends. When not determining that the virtual leading vehicle system has ended, the processing returns to step S4 to repeat the flow. Further, in the present embodiment, while the virtual leading vehicle system is activated, the control flow is repeatedly executed at fixed intervals. Specifically, the controller 110 acquires surrounding information of the vehicle 200 at fixed intervals, and updates the virtual surrounding information based on the acquired surrounding information. This makes it possible to update the surrounding environment of the virtual vehicle in response to real-time changes in the surrounding environment due to the vehicle 200 traveling. Similarly, for the virtual vehicle image displayed to the first user, the position of the virtual vehicle is updated in real time according to the second user's steering.

Next, the procedure of the information processing method in the information processing device 100, the vehicle 200, and the terminal device 300 according to the present embodiment will be described with reference to FIG. 5. FIG. 5 is a flowchart illustrating the procedure of the information processing method according to the present embodiment. In the present embodiment, when the first user of the vehicle 200 activates the virtual leading vehicle system to start using it, information processing according to the present embodiment starts from step S21.

In step S21, the information processing device 100 sets an initial set position as the virtual viewpoint position. In step S22, the information processing device 100 generates a virtual vehicle image. In step S23, the information processing device 100 transmits to the vehicle 200 a control signal for controlling the first information output device 240 to display the virtual vehicle image so as to be superimposed at the virtual viewpoint position on the real scenery of the surrounding environment of the vehicle 200. In step S24, the vehicle 200 receives the control signal transmitted in step S23 from the information processing device 100. In step S25, the vehicle 200 displays the virtual vehicle image to the first user through the first information output device 240.

In step S26, the vehicle 200 detects surrounding information of the surrounding environment of the vehicle 200 with the sensor group 220. In step S27, the vehicle 200 transmits the surrounding information detected in step S26 to the information processing device 100. In step S28, the information processing device 100 receives the surrounding information from the vehicle 200. In step S29, the information processing device 100 generates virtual surrounding information including a virtual surrounding image and a virtual ambient sound. In step S30, the information processing device 100 transmits the virtual surrounding information generated in step S29 to the terminal device 300. In step S31, the terminal device 300 receives the virtual surrounding information from the information processing device 100. In step S32, the terminal device 300 outputs the virtual surrounding information to the second user through the second information output device 340.

In step S33, the terminal device 300 acquires driving operation information input to the input device 320 by the second user. In step S34, the terminal device 300 transmits the driving operation information acquired in step S33 to the information processing device 100. In step S35, the information processing device 100 receives the driving operation information from the terminal device 300. In step S36, the information processing device 100 updates the virtual viewpoint position based on movement instruction information received as the driving operation information in step S35.

In step S37, the information processing device 100 transmits to the vehicle 200 a control signal for displaying the virtual vehicle image at the updated virtual viewpoint position. Specifically, the information processing device 100 transmits a control signal for displaying the virtual vehicle image so that the position of the virtual vehicle image is moved according to the movement of the virtual viewpoint position. In step S38, the vehicle 200 receives the control signal transmitted from the information processing device 100 in step S37. In step S39, the vehicle 200 displays the virtual vehicle image on the first information output device so as to be superimposed at the updated virtual viewpoint position. This makes it possible to move the virtual vehicle image displayed to the first user according to the second user's steering of the virtual vehicle, so that the first user can view the virtual vehicle as if it were traveling ahead of the vehicle 200.

In step S40, the information processing device 100 determines whether or not the virtual leading vehicle system has ended. When determining that the virtual leading vehicle system has ended, the flow ends. When not determining that the virtual leading vehicle system has ended, the processing returns to step S26 to repeat the flow.

As described above, in the present embodiment, surrounding information of surrounding environment of a vehicle is acquired; a virtual viewpoint position ahead of the vehicle in a traveling direction is set; the acquired surrounding information is used to generate virtual surrounding information indicating the surrounding environment at the set virtual viewpoint position; a first control signal for controlling an external device located at a location away from the vehicle to display the generated virtual surrounding information is transmitted; driving operation information on a driving operation of the vehicle output from the external device is received; driving assistance information for assisting driving of the vehicle is generated based on the received driving operation information; and a second control signal for controlling an output device installed in the vehicle to output the driving assistance information is generated. This makes it possible for the driver to drive the vehicle by following remote assistance in response to changes in the traveling circumstances without delay.

Further, in the present embodiment, a surrounding image of the surrounding environment of the vehicle is acquired; the acquired surrounding image is used to generate a virtual surrounding image representing the surrounding environment at the set virtual viewpoint position; and a control signal for controlling the external device to display the generated virtual surrounding image is transmitted as the first control signal. This makes it possible for an operator who inputs driving operation information to the external device to input the driving operation information while viewing the surrounding environment at the virtual viewpoint position ahead of the vehicle in the traveling direction.

Further, in the present embodiment, position information indicating a position of the vehicle is acquired; the virtual viewpoint position in the surrounding environment of the vehicle is calculated with the position of the vehicle as a reference; and the surrounding image is used to generate the virtual surrounding image based on the virtual viewpoint position. This makes it possible to use the surrounding image and generate a virtual surrounding image of the virtual viewpoint position based on the positional relationship in the surrounding environment with the position of the own vehicle as a reference.

Further, in the present embodiment, the surrounding image is acquired from at least one of sensor information acquired by the vehicle, sensor information acquired by another vehicle, and sensor information acquired by an infrastructure sensor installed along a traveling road. This makes it possible to acquire even a surrounding image of a place that cannot be acquired by the sensors of the own vehicle because it is a blind spot.

Further, in the present embodiment, position information indicating a position of the vehicle is acquired, and a third control signal for controlling the external device to display the position information of the vehicle and position information of the virtual viewpoint position is transmitted. This makes it possible for an operator who inputs driving operation information to the external device to input the driving operation information while viewing a positional relationship between the vehicle and the virtual viewpoint position.

Further, in the present embodiment, a virtual vehicle image representing a virtual vehicle is generated; a control signal for controlling the output device to display the virtual vehicle image so as to be superimposed at the virtual viewpoint position on a real scenery of the surrounding environment of the vehicle is generated as the second control signal; and the second control signal is transmitted to the output device. This makes it possible for the driver to drive the vehicle in response to changes in the traveling circumstances without delay while viewing the virtual vehicle ahead of the vehicle in the traveling direction.

Further, in the present embodiment, movement instruction information for moving the virtual viewpoint position is received as the driving operation information, and the virtual viewpoint position is moved according to the movement instruction information. This makes it possible for the driver to drive the vehicle in response to changes in traveling circumstances without delay while viewing the movement of the virtual vehicle displayed at the virtual viewpoint position.

Further, in the present embodiment, device control information for controlling an in-vehicle device of the virtual vehicle is received as the driving operation information, and the virtual vehicle image representing the virtual vehicle in which the in-vehicle device is controlled is generated based on the device control information. This makes it possible for the driver to drive the vehicle in response to changes in traveling circumstances without delay while viewing the operating condition of the in-vehicle device of the virtual vehicle.

Further, in the present embodiment, it is determined whether or not a distance from the vehicle to the virtual viewpoint position is equal to or greater than a predetermined distance; and when determining that the distance is equal to or greater than the predetermined distance, the virtual viewpoint position is reset to a position at which the distance from the vehicle to the virtual viewpoint position is shorter than the predetermined distance. This makes it possible to return the virtual viewpoint position to the vicinity of the vehicle even when the virtual viewpoint position has moved away from the vehicle.

Further, in the present embodiment, sound information regarding driving guidance for the vehicle is received as the driving operation information; a sound control signal for controlling the output device to output the sound information is generated; and the sound control signal is transmitted to the output device. This makes it possible for the driver to drive the vehicle in response to changes in traveling circumstances without delay while hearing the driving guidance.

Further, in the present embodiment, the driving operation information regarding a driving operation at a time when the vehicle reaches the virtual viewpoint position is received. This makes it possible for the driver to grasp the driving operation at a position ahead of the vehicle in the traveling direction.

Note that the embodiment described above is described to facilitate understanding of the present invention, and is not described to limit the present invention. Therefore, the elements disclosed in the above embodiment are meant to include all design changes and equivalents that fall within the technical scope of the present invention.

DESCRIPTION OF REFERENCE NUMERALS

10 Information processing system
100 Information processing device
110 Controller
111 Surrounding information acquisition unit
112 Virtual viewpoint position setting unit
113 Image generation unit
114 Sound information generation unit
115 Transmission unit
116 Reception unit
117 Driving assistance information control unit
120 Communication device
200 Vehicle
210 In-vehicle controller
220 Sensor group
230 In-vehicle communication device
240 First information output device
250 Input device
260 Map database
300 Terminal device
310 Terminal controller
320 Input device
330 Terminal communication device
340 Second information output device

The invention claimed is:

1. An information processing device configured to:

acquire surrounding information about the surrounding environment of a vehicle;

set a virtual viewpoint position ahead of the vehicle in a traveling direction, the virtual viewpoint position being a position of a virtual vehicle traveling ahead of the vehicle in the surrounding environment;

use the acquired surrounding information and generate virtual surrounding information indicating the surrounding environment at the set virtual viewpoint position;

transmit a first control signal for controlling an external device located at a location away from the vehicle to output the generated virtual surrounding information;

receive, from the external device, movement instruction information for moving the virtual viewpoint position as driving operation information on a driving operation of the vehicle input by a second user;

move the virtual viewpoint position according to the movement instruction information;

generate driving assistance information for assisting a first user who manually drives the vehicle based on the received driving operation information, and generate a second control signal for controlling an output device in the vehicle to output the driving assistance information, the output device being a device for outputting image information to the first user; and transmit the second control signal to the output device, wherein the second control signal is a control signal for controlling the output device to display a virtual vehicle image representing the virtual vehicle so as to be superimposed at the virtual viewpoint position on a real scenery of the surrounding environment of the vehicle.

2. The information processing device according to claim 1, further configured to:

acquire a surrounding image of the surrounding environment of the vehicle, use the acquired surrounding image and generate a virtual surrounding image representing the surrounding environment at the set virtual viewpoint position, and transmit, as the first control signal, a control signal for controlling the external device to display the generated virtual surrounding image.

3. The information processing device according to claim 2, further configured to:

acquire position information indicating a position of the vehicle;

calculate the virtual viewpoint position in the surrounding environment of the vehicle with the position of the vehicle as a reference; and use the surrounding image and generate the virtual surrounding image based on the virtual viewpoint position.

4. The information processing device according to claim 2, further configured to:

acquire the surrounding image from at least one of sensor information acquired by the vehicle, sensor information acquired by another vehicle, and sensor information acquired by an infrastructure sensor installed along a traveling road.

5. The information processing device according to claim 1, further configured to:

acquire position information indicating a position of the vehicle; and transmit a third control signal for controlling the external device to display the position information of the vehicle and position information of the virtual viewpoint position.

6. The information processing device according to claim 1, further configured to:

receive, as the driving operation information, device control information for controlling an in-vehicle device of the virtual vehicle; and generate, based on the device control information, the virtual vehicle image representing the virtual vehicle in which the in-vehicle device is controlled.

7. The information processing device according to claim 1, further configured to:

determine whether or not a distance from the vehicle to the virtual viewpoint position is equal to or greater than a predetermined distance; and when determining that the distance is equal to or greater than the predetermined distance, reset the virtual viewpoint position to a position at which the distance is shorter than the predetermined distance.

8. The information processing device according to claim 1, further configured to:

receive, as the driving operation information, sound information regarding driving guidance for the vehicle, generate a sound control signal for controlling the output device to output the sound information; and transmit the sound control signal to the output device.

9. The information processing device according to claim 1, further configured to:

receive the driving operation information regarding a driving operation at a time at which the vehicle reaches the virtual viewpoint position.

10. An information processing method comprising:

acquiring surrounding information of surrounding environment of a vehicle;

setting a virtual viewpoint position ahead of the vehicle in a traveling direction, the virtual viewpoint position being a position of a virtual vehicle traveling ahead of the vehicle in the surrounding environment;

using the acquired surrounding information and generating virtual surrounding information indicating the surrounding environment at the set virtual viewpoint position;

transmitting a first control signal for controlling an external device located at a location away from the vehicle to display the generated virtual surrounding information;

receiving, from the external device, movement instruction information for moving the virtual viewpoint position as driving operation information on a driving operation of the vehicle input by a second user;

moving the virtual viewpoint position according to the movement instruction information;

generating driving assistance information for assisting a first user who manually drives the vehicle based on the received driving operation information; and generating a second control signal for controlling an output device in the vehicle to output the driving assistance information, the output device being a device for outputting image information to the first user; and transmitting the second control signal to the output device, wherein the second control signal is a control signal for controlling the output device to display a virtual vehicle image representing the virtual vehicle so as to be superimposed at the virtual viewpoint position on a real scenery of the surrounding environment of the vehicle.

* * * * *